United States Patent [19]
Foo et al.

[11] Patent Number: 5,758,899
[45] Date of Patent: Jun. 2, 1998

[54] METHOD AND APPARATUS FOR PROVIDING A SAFING FUNCTION FOR SIDE IMPACT CRASH SENSING SYSTEMS

[75] Inventors: Chek Peng Foo, Ann Arbor; Huahn Fern Yeh, Novi, both of Mich.

[73] Assignee: TRW Inc., Lyndhurst, Ohio

[21] Appl. No.: 490,715

[22] Filed: Jun. 15, 1995

[51] Int. Cl.$^6$ .................................................. B60R 21/22
[52] U.S. Cl. ...................... 280/730.2; 280/735; 340/436
[58] Field of Search .................................. 280/734, 735, 280/730.2; 340/438, 439, 440, 436; 180/274, 282

[56] References Cited

U.S. PATENT DOCUMENTS

| | | |
|---|---|---|
| 3,720,426 | 3/1973 | Johnston . |
| 3,889,232 | 6/1975 | Bell . |
| 4,958,851 | 9/1990 | Behr et al. . |
| 5,037,129 | 8/1991 | Fritz et al. . |
| 5,083,276 | 1/1992 | Okano et al. ............ 280/735 |
| 5,172,790 | 12/1992 | Ishikawa et al. . |
| 5,208,484 | 5/1993 | Okano et al. . |
| 5,283,472 | 2/1994 | Takeuchi et al. ......... 180/282 |
| 5,322,323 | 6/1994 | Ohno et al. . |
| 5,338,062 | 8/1994 | Kiuchi et al. . |
| 5,357,141 | 10/1994 | Nitschke et al. . |
| 5,484,166 | 1/1996 | Mazur et al. . |

FOREIGN PATENT DOCUMENTS

| | | |
|---|---|---|
| 0292669 | 11/1988 | European Pat. Off. . |
| 0311039 | 4/1989 | European Pat. Off. . |
| 0342401 | 11/1989 | European Pat. Off. . |
| 0444866 | 9/1991 | European Pat. Off. . |
| 0531989A1 | 3/1993 | European Pat. Off. . |
| 0536624 | 4/1993 | European Pat. Off. . |
| 0536624A1 | 4/1993 | European Pat. Off. . |
| 320674 | of 0000 | Japan . |
| 4176754 | of 0000 | Japan . |
| 9205979 | 4/1992 | WIPO . |

OTHER PUBLICATIONS

A non-translated German article dated Oct. 1994, pp. 618–619. This article appears to to disclose an air bag restraint system having multiple sensors.

"Side impact and sensing", by Kevin Jost, Automotive Engineering, May 1995, pp. 62–63.

"Steuerung Eines Mehrfach–Rückhaltesystems", by Von Guido Wetzel, ATZ Automobiltechnische Zeitschrift, Oct. 1994, pp. 618–619.

Primary Examiner—Eric D. Culbreth
Attorney, Agent, or Firm—Tarolli, Sundheim, Covell Tummino & Szabo

[57] ABSTRACT

An apparatus (10) for controlling actuation of a first actuatable restraint (18) and a second actuatable restraint (20) includes a first crash accelerometer (22) for providing a primary crash acceleration signal when a crash event is sensed in a first direction and a safing crash acceleration signal when a crash event is sensed in a second direction. A second crash accelerometer (34) provides a safing crash acceleration signal when a crash event is sensed in the first direction and a primary crash acceleration signal when a crash event is sensed in the second direction. The first actuatable restraint (18) is actuated when the first accelerometer (22) provides the primary crash acceleration signal and the second accelerometer (34) provides the safing crash signal. The second actuatable restraint (20) is actuated when the first accelerometer (22) provides the safing crash signal and the second accelerometer (34) provides said primary crash signal.

15 Claims, 2 Drawing Sheets

METHOD AND APPARATUS FOR PROVIDING A SAFING FUNCTION FOR SIDE IMPACT CRASH SENSING SYSTEMS

BACKGROUND OF THE INVENTION

1. Technical Field

The present invention is directed to an occupant restraint system in a vehicle and specifically to a method and apparatus for providing a safing function for side impact crash sensing systems.

2. Description of the Prior Art

Systems for restraining vehicle occupants during front and side impacts are known in the art. A side restraint system includes an air bag assembly, each vehicle side seat location having an associated air bag assembly. A controller is connected to the assembly. The controller controls actuation of the air bag in response to signals provided from a plurality of crash sensors. Typically, each air bag assembly has an associated crash sensor mounted in the associated side assembly of the vehicle. A typical crash sensor is a "crush sensor" such as a contact switch which detects the crushing of a vehicle door during a side impact.

Front restraint systems typically include two crash sensors. One of the crash sensors functions as a "primary" crash sensor. The other crash sensor is referred to as a safing crash sensor. Actuation of the restraint system requires detection of a deployment crash condition by both the primary sensor and the safing sensor.

SUMMARY OF THE INVENTION

In accordance with the present invention, crash sensors are provided on each side of the vehicle for sensing side impacts. A controller monitors both of the crash sensors. Each of the crash sensors function as a primary crash sensor and as a safing crash sensor depending on the direction of the crash event. Therefore, each of the sensors perform a selected one of two possible functions.

In accordance with one aspect of the present invention, an apparatus for controlling an actuatable restraint comprises first acceleration sensing means having an axis of sensitivity and mounted to the vehicle with the axis of sensitivity of the first acceleration sensing means oriented in a first direction. The first acceleration sensing means provides a primary crash signal when crash acceleration is sensed in the first direction. Second acceleration sensing means has an axis of sensitivity and is mounted to the vehicle with the axis of sensitivity of the second acceleration sensing means being oriented in a second direction substantially parallel with and 180 degrees from the first direction. The second acceleration sensing means provides a safing crash signal when crash acceleration is sensed in the first direction. Means are provided for actuating the actuatable restraint when the first crash sensing means provides the primary crash signal and the second crash sensing means provides the safing crash signal.

In accordance with another aspect of the present invention, an apparatus for controlling actuation of a first actuatable restraint and a second actuatable restraint comprises first crash sensing means for providing a primary crash signal when a crash event is sensed in a first direction and a safing crash signal when a crash event is sensed in a second direction. Second crash sensing means provides a safing crash signal when a crash event is sensed in the first direction and a primary crash signal when a crash event is sensed in the second direction. Means are provided for actuating the first actuatable restraint when the first crash sensing means provides the primary crash signal and the second crash sensing means provides the safing crash signal. The apparatus further comprises means for actuating the second actuatable restraint when the first crash sensing means provides the safing crash signal and the second crash sensing means provides the primary crash signal.

In accordance with another embodiment of the present invention, a method for controlling actuation of a first actuatable restraint and a second actuatable restraint comprises the steps of sensing with a first crash sensor a crash acceleration, providing a primary crash signal when the first crash sensor senses a crash event in a first direction, and providing a safing crash signal when the first crash sensor senses a crash event in a second direction. The method further includes the steps of sensing with a second crash sensor a crash acceleration, providing a safing crash signal when the second crash sensor senses a crash event in the first direction, and providing a primary crash signal when the second crash sensor senses a crash event in the second direction. The method further includes actuating the first actuatable restraint when both said first and second crash sensors sense a crash event in said first direction and actuating the second actuatable restraint when both said first and second crash sensor sense a crash event in said second direction.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENT

Figure 1:
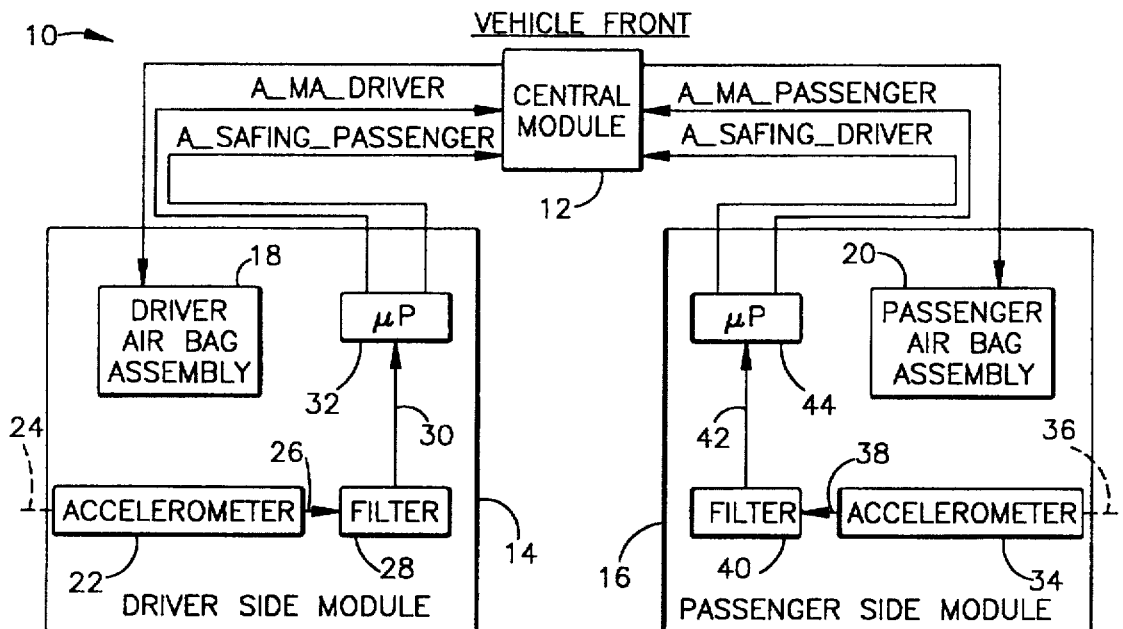
FIG. 1 is a block diagram of a vehicle side impact restraint system in accordance with the present invention.

Referring to FIG. 1, a vehicle side impact restraint system 10 in accordance with the present invention includes a central control module 12. The central control module 12 is preferably a microcomputer programmed to execute a desired control process. A driver's side module 14 is connected to the central control module 12. A passenger's side module 16 is connected to the central control module.

The driver's side module 14 includes an accelerometer 22. The accelerometer 22 senses acceleration in a direction parallel to its axis of sensitivity 24 and provides an accelerometer signal 26 indicative of the sensed crash acceleration along its axis of sensitivity. The accelerometer 22 is, in accordance with one embodiment, mounted in a vehicle driver's side door such that its axis of sensitivity 24 is transverse to the vehicle direction of travel, i.e., transverse to the fore and aft direction of the vehicle. Moreover, the axis of sensitivity 24 is oriented so that the acceleration signal 26 has a positive value when the sensed acceleration has a component toward the center of the vehicle, i.e., into the door. When an impact into the driver side of the vehicle occurs, the acceleration signal 26 has a positive value. An impact to the passenger side of the vehicle will result in the acceleration signal 26 having a negative value.

A filter 28 filters the acceleration signal 26 and outputs a filtered acceleration signal 30. The filter 28 functions as an anti-alias filter to block frequencies in the acceleration signal above a certain cutoff value. Such frequencies could result in aliasing of the analog filtered acceleration signal 30 when this signal is converted to a digital signal. A microcomputer 32 periodically samples the filtered acceleration signal 30 and performs an analog-to-digital ("A/D") conversion on each sample. The A/D conversion of a sample results in a digital value representing the analog value of that sample. The sample rate of the microcomputer 32 is chosen to satisfy known sampling criteria and guarantee that the digital values accurately represent the filtered acceleration signal 30.

The passenger side module 16 is similar to the driver side module 14. It includes an accelerometer 34 which senses acceleration along its axis of sensitivity 36 and provides an acceleration signal 38 indicative thereof. The accelerometer 34 is, in accordance with one embodiment of the present invention, mounted in a vehicle passenger side door such that its axis of sensitivity 36 is substantially transverse to the vehicle direction of travel, i.e., substantially transverse to the fore and aft direction of the vehicle. Moreover, the axis of sensitivity 36 is oriented so that the acceleration signal 38 has a positive value when the sensed acceleration has a component into the passenger side of the vehicle. Thus, when an impact to the passenger side of the vehicle occurs, the acceleration signal 38 has a positive value. An impact to the driver side of the vehicle will, conversely, cause the acceleration signal 38 to have a negative value.

A filter 40 filters the acceleration signal 38 and outputs a filtered acceleration signal 42. The filter 40 functions as an anti-alias filter to block frequencies above a cutoff value which could result in aliasing when the analog filtered acceleration signal 42 is converted to a digital signal. A microcomputer 44 periodically samples the filtered acceleration signal 42 and performs a conversion on each sample. The A/D conversion of a sample results in a digital value representing the analog value of that sample. The sample rate of the microcomputer 44 is chosen to satisfy known sampling criteria and guarantee that the digital values accurately represent the filtered acceleration signal 42.

Since the vehicle acceleration monitored by each accelerometer 22 and 34 has two sensing capabilities, i.e., positive and negative or into the driver's or passenger's side, the single sensor associated with a single side of the vehicle can serve two functions. First, a positive crash acceleration value from the driver's side accelerometer 22 is used to detect a crash event into the driver's side of the vehicle. Second, the negative output from the driver's side accelerometer 22 is used as a passenger's side safing function for the purpose of verifying an event into the passenger's side of the vehicle. Similarly, the positive acceleration signal from the passenger's side accelerometer 34 is used to detect a crash event into the passenger's side of the vehicle. A negative output from the passenger's side accelerometer 34 is used as the driver's side safing function to verify a crash event into the driver's side of the vehicle. Actuation of a driver's associated restraint device occurs only after a driver's side accelerometer detects a deployment crash event into the driver's side and the passenger's side accelerometer verifies the crash event into the driver's side. Actuation of a passenger's associated restraint device occurs only after the passenger's side accelerometer detects a deployment crash event into the passenger's side and the driver's side accelerometer verifies the crash event into the passenger's side.

Each digital value of acceleration from the driver's side accelerometer 22 is designated A(k), where A(k) represents the most recent sample, A(k−1) the next most recent sample, and so forth. The six most recent digital values (i.e., A(k−5), A(k−4), A(k−3), A(k−2), A(k−1), and A(k)) are stored in memory in the microcomputer 32. The microcomputer 32 uses these stored digital values to calculate a driver's crash value and a passenger's safing value.

Each digital value from the passenger's side accelerometer 34 is designated A'(k), where A'(k) represents the most recent sample, A'(k−1) the next most recent sample, and so forth. The six most recent digital values (i.e., A'(k−5), A'(k−4), A'(k−3), A'(k−2), A'(k−1), and A'(k)) are stored in memory in the microcomputer 44. The microcomputer 44 uses these stored digital values to calculate a passenger's crash value and a driver's safing value.

The driver's crash value is designated A_MA_DRIVER and represents the crash acceleration value sensed by accelerometer 22 in response to crash force into the driver's door, i.e., a value determined in response to positive acceleration signals from accelerometer 22. The passenger's safing value is designated A_SAFING_PASSENGER and represents a value sensed by accelerometer 22 in response to crash force into the passenger's door, i.e., a value determined in response to negative acceleration signals from accelerometer 22. A_MA_DRIVER is determined using a six point moving average in accordance with the formula $$A\_MA\_DRIVER = \frac{A(k-5) + A(k-4) + A(k-3) + A(k-2) + A(k-1) + A(k)}{6} \quad (1)$$

A_SAFING_PASSENGER is determined using a three point moving average in accordance with the formula $$A\_SAFING\_PASSENGER = \frac{A(k-2) + A(k-1) + A(k)}{3} \quad (2)$$

After calculating the crash value A-MA-Driver and safing value A_SAFING_PASSENGER, the microcomputer 32 outputs these values to the central module 12.

The passenger's crash value is designated A_MA_PASSENGER, is determined using a six point moving 10 average in accordance with the formula $$A\_SAFING\_DRIVER = \frac{A'(k-5) + A'(k-4) + A'(k-3) + A'(k-2) + A'(k-1) + A'(k)}{6} \quad (3)$$

The driver's safing value, designated A-Safing-Driver, is determined using a three point moving average in accordance with the formula $$A\text{-Safing-Driver} = \frac{A'(k-2) + A'(k-1) + A'(k)}{3} \quad (4)$$

After calculating the passenger's crash value A_MA_PASSENGER and driver's safing value A_SAFING_DRIVER, the microcomputer 44 outputs these values to the central control module 12.

In response to the crash and safing values output by the side modules 14 and 16, the central control module 12 determines whether a driver's side or passenger's side crash is occurring. To make this determination, the central control module 12 compares each of the crash and safing values against associated threshold values. The threshold values are stored in the memory of the central control module 12. Two threshold values are stored, a crash threshold value $T_c$ and a safing threshold value $T_s$. The crash threshold value $T_c$ has a positive value while the safing threshold value $T_s$ has a negative value.

More specifically, the central control module 12 detects driver's side crashes from the A_MA_DRIVER crash value and the A_SAFING_DRIVER safing value. When A_SAFING_DRIVER is greater than the crash threshold value $T_c$ and A_SAFING_DRIVER is less than the safing threshold value $T_s$, the central control module 12 concludes that a driver side crash is occurring. In response to this determination, the central control module 12 activates the driver's side air bag assembly 18 to deploy the associated air bag.

The central module 12 uses the "less than" criterion for the safing value because of the 180° offset orientation between the axes-of-sensitivity of the accelerometers. When a driver side crash is occurring, the vehicle experiences an acceleration in a direction from the driver side to the passenger side. i.e., into the driver side. As a result, the acceleration signal 26 provided by the driver's side accelerometer 22 has a positive value. In contrast, the acceleration signal 38 provided by the passenger's side accelerometer 34 has a negative value. The "less than" criterion is used to determine when this negative value of acceleration has exceeded (i.e., become more negative than) a particular negative threshold.

The occurrence of a passenger's side crash is detected in a similar manner. Central control module 12 monitors the A_MA_PASSENGER crash value and the A_SAFING_PASSENGER safing value. When A_MA_PASSENGER is greater than the crash threshold value $T_c$ and A_SAFING_PASSENGER is less (i.e., more negative) than the safing threshold value $T_s$, the central module 12 concludes that a passenger side crash is occurring. In response to this determination, the central module activates the passenger's side air bag assembly 20 to deploy the associated air bag.

In the present system, therefore, the central module 12 utilizes a safing value determined from the accelerometer signal on the vehicle side opposite the crash. For example, in a driver's side crash condition the A_SAFING_DRIVER safing value is derived from the acceleration signal 38 provided by the passenger side accelerometer 34. No separate safing sensor is required with the present system. Instead, each sensor serves two sensing functions.

Figure 2:
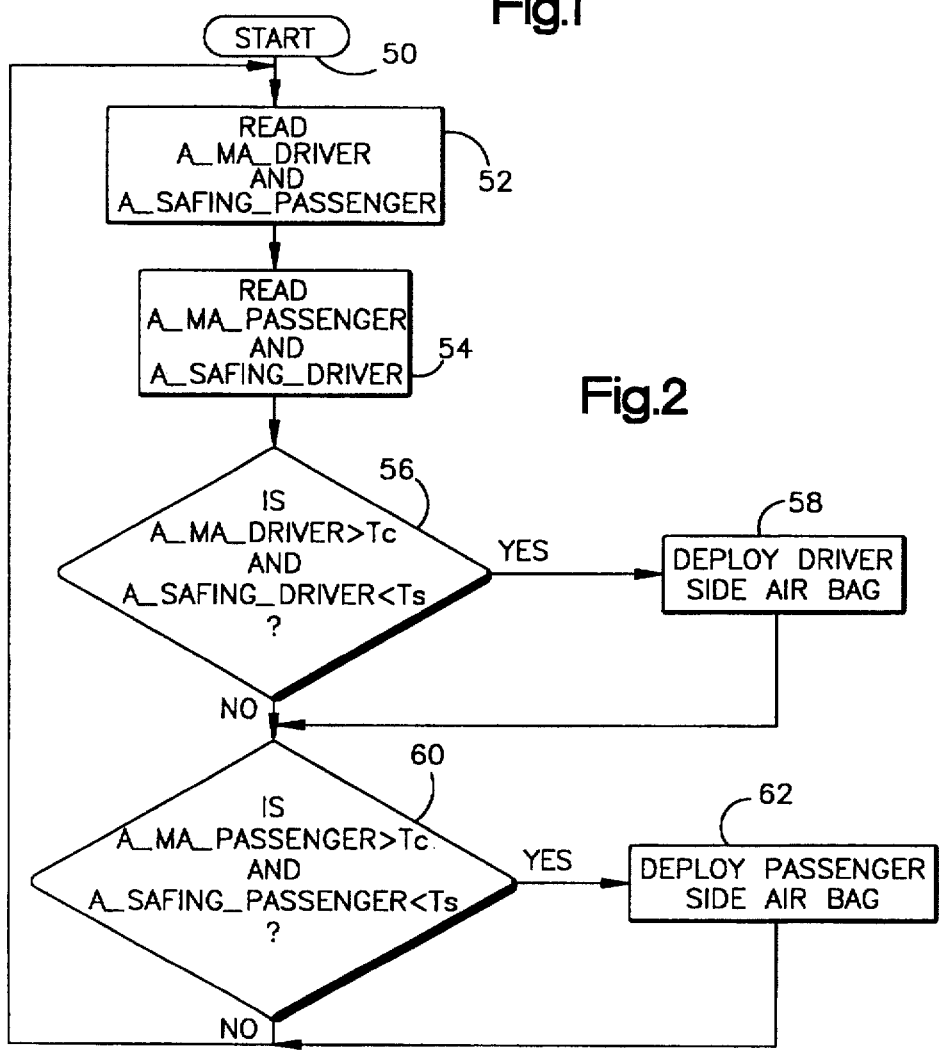
FIG. 2 is a flowchart of the control process executed by the central control module of FIG. 1.

Referring to FIG. 2, the control process executed by the central control module 12 starts in step 50. In step 52, the central control module 12 reads the A_MA_DRIVER crash value and A_SAFING_PASSENGER safing value output from the microcomputer 32 in the driver side module 14. From step 52, the process goes to step 54. In step 54, the central module 12 reads the A_MA_PASSENGER crash value and the A_SAFING_DRIVER safing value output from the microcomputer 44 in the passenger side module 16. The process then proceeds to step 56.

In step 56, the central module 12 determines whether A_MA_DRIVER is greater than the crash threshold value $T_c$ and A_SAFING_DRIVER is less than the safing threshold value $T_s$. If the determination in step 56 is affirmative, a driver's side crash is occurring. In this situation, the process goes to step 58 and the central module 12 activates the driver side air bag assembly 18 to deploy the driver's side air bag. If the determination in step 56 is negative, then a driver's side crash is not occurring and the process proceeds to step 60. If the driver's side air bag was deployed in step 58, the process proceeds to step 60.

In step 60, the central module determines whether A_MA_PASSENGER is greater than the crash threshold value $T_c$ and A_SAFING_PASSENGER is less than the safing threshold value $T_s$. If the determination in step 60 is affirmative, a passenger's side crash is occurring. In this situation, the process goes to step 62 and the central module 12 activates the passenger's side air bag assembly 20 to deploy the passenger side air bag. If the determination in step 60 is negative, however, the process goes back to step 52. If the passenger's side air bag was deployed in step 62, the process loops back to step 52. The central module 12 continuously monitors and evaluates the crash and safing values output by the side modules 14 and 16.

Figure 3:
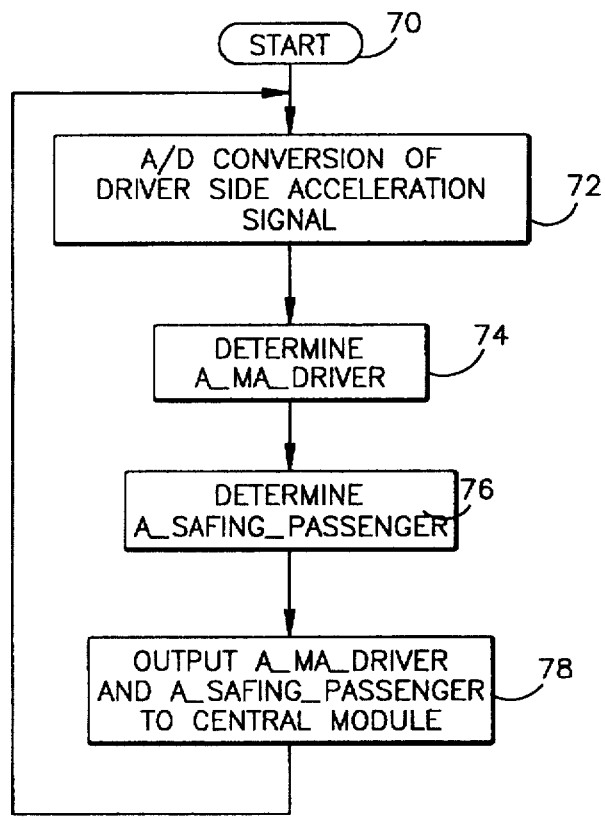
FIG. 3 is a flowchart of the control process of the driver side module of FIG. 1.

Referring to FIG. 3, the process executed by the driver's side module 14 starts in step 70 and proceeds to step 72. In step 72, the driver's side module 14 performs the A/D conversion of the filtered acceleration signal 30. The process thereafter goes to step 74 and determines the A_MA_DRIVER crash value in accordance with formula (1). From step 74, the process goes to step 76 and determines the A_SAFING_PASSENGER safing value in accordance with formula (2). The process then goes to step 78 and the driver side module 14 outputs the A_MA_DRIVER and A_SAFING_PASSENGER values to the central module 12. After executing step 78, the process loops back to step 72. The driver's side module 14 continuously executes the process defined by steps 72 to 78.

Figure 4:
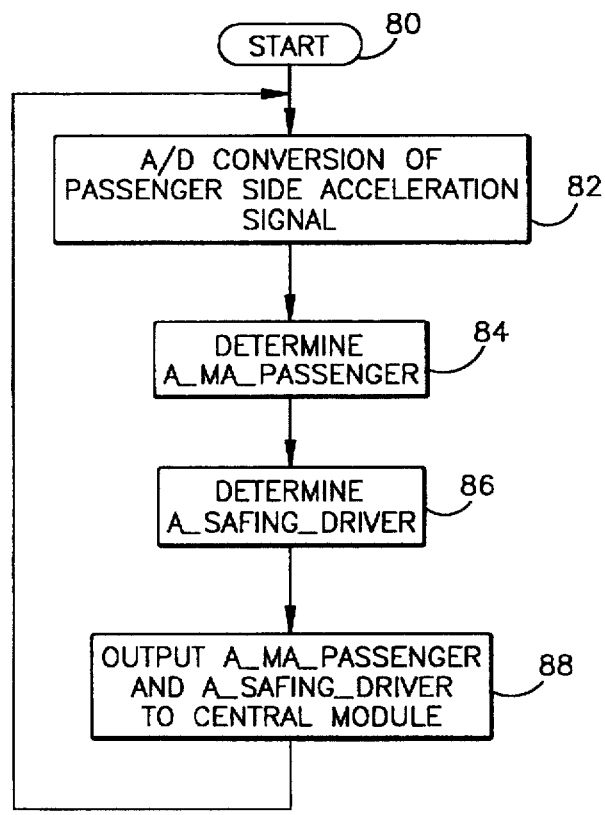
FIG. 4 is a flowchart of the control process of the passenger side module of FIG. 1.

Referring to FIG. 4, the process executed by the passenger's side module 16 starts in step 80 and proceeds to step 82. In step 82, the passenger's side module 16 performs the A/D conversion of the filtered acceleration signal 42. The process thereafter goes to step 84 and determines the A_MA_PASSENGER crash value in accordance with formula (3). From step 84, the process goes to step 86 and determines the A_SAFING_DRIVER safing value in accordance with formula (4). The process then loops to step 88 and the passenger's side module 16 outputs the A_MA_PASSENGER and A_SAFING_DRIVER values to the central module 12. After executing step 88, the process goes back to step 82. The passenger's side module 16 continuously executes the process defined by steps 82 to 88.

The values determined in steps 72–78 and 82–88 are those output to central control module 12 and those used in steps 52 and 54 of FIG. 2.

In the system described, each accelerometer provides distinguishably different signals for accelerations in two opposing directions. Thus, each accelerometer provides one signal for accelerations caused by impacts on its respective side of the vehicle, and another, distinguishably different, signal for accelerations caused by impacts on the opposite side of the vehicle. Therefore, two sensors provide redundant detection of crashes on either side of the vehicle. The sensor on the same side as the crash (the near side sensor) will provide a large acceleration signal, and the sensor on the other side of the vehicle (the far side sensor) will provide a smaller, distinguishably different acceleration signal. Reliability is enhanced by using the output of the opposite side sensor to verify that the output of the near side sensor.

In the described embodiment, each acceleration signal was averaged over time and then compared against a threshold. Other algorithmic analysis techniques could instead be used. Moreover, different algorithms could be used to analyze the primary crash and safing crash signals.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an actuatable restraint, comprising:

first acceleration sensing means having an axis of sensitivity and mounted to a vehicle with the axis of sensitivity of said first acceleration sensing means oriented in a first direction, said first acceleration sensing means providing a primary crash signal when crash acceleration is sensed in said first direction;

second acceleration sensing means having an axis of sensitivity and mounted to the vehicle with the axis of sensitivity of said second acceleration sensing means being oriented substantially parallel with said first direction and 180 degrees from the axis of sensitivity of said first acceleration sensing means, said second acceleration sensing means providing a safing crash signal when crash acceleration is sensed in said first direction; and means for actuating said actuatable restraint when said first crash sensing means provides said primary crash signal and said second crash sensing means provides said safing crash signal.

2. An apparatus for controlling actuation of a first actuatable restraint and a second actuatable restraint in a vehicle, comprising:

first crash sensing means for providing a primary crash signal when a crash event is sensed in a first direction and a safing crash signal when a crash event is sensed in a second direction;

second crash sensing means for providing a safing crash signal when a crash event is sensed in said first direction and a primary crash signal when a crash event is sensed in said second direction;

means for actuating said first actuatable restraint when said first crash sensing means provides said primary crash signal and said second crash sensing means provides said safing crash signal; and means for actuating said second actuatable restraint when said first crash sensing means provides said safing crash signal and said second crash sensing means provides said primary crash signal.

3. The apparatus of claim 2 wherein each of said first crash sensing means and said second crash sensing means are both accelerometers having an associated axis of sensitivity.

4. The apparatus of claim 3 wherein said first crash sensing means is positioned with its associated axis of sensitivity substantially transverse to a direction of travel of the vehicle and said second crash sensing means is positioned with its associated axis of sensitivity substantially transverse to the vehicle direction of travel and 180° offset from said axis of sensitivity associated with said first crash sensing means.

5. The apparatus of claim 4 wherein said means for actuating said first actuatable restraint actuates said first restraint when said primary crash signal from said first crash sensing means exceeds a primary threshold and said safing crash signal from said second crash sensing means is less than a safing threshold, and wherein said means for actuating said second actuatable restraint actuates said second restraint when said primary crash signal from said second crash sensing means exceeds said primary threshold and said safing crash signal from said first sensing means is less than said safing threshold.

6. The apparatus of claim 4 wherein said first restraint is an air bag operatively mounted in a side assembly of the vehicle associated with the vehicle driver's side and wherein said second restraint is an air bag operatively mounted in a side assembly of the vehicle associated with the vehicle passenger's side.

7. An apparatus for controlling actuation of a first actuatable restraint and a second actuatable restraint, comprising:

a first crash accelerometer for providing a positive crash acceleration signal when a crash event is sensed in a first direction and a negative crash acceleration signal when a crash event is sensed in a second direction;

a second crash accelerometer for providing a negative crash acceleration signal when a crash event is sensed in said first direction and a positive crash acceleration signal when a crash event is sensed in said second direction;

means for actuating said first actuatable restraint when said first accelerometer provides said positive crash acceleration signal and said second accelerometer provides said negative crash signal; and means for actuating said second actuatable restraint when said first accelerometer provides said negative crash signal and said second accelerometer provides said positive crash signal.

8. The apparatus of claim 7 wherein said means for actuating said first actuatable restraint actuates said first restraint when said positive crash acceleration signal from said first accelerometer crash sensing means exceeds a primary threshold and said negative acceleration signal from said second accelerometer is less than a safing threshold, and wherein said means for actuating said second actuatable restraint actuates said second restraint when said positive crash acceleration signal from said second accelerometer exceeds said primary threshold and said negative crash acceleration signal from said first accelerometer is less than said safing threshold.

9. The apparatus of claim 7 wherein said first restraint is an air bag operatively mounted in a side assembly of a vehicle associated with a vehicle driver's side and wherein said second restraint is an air bag operatively mounted in a side assembly of the vehicle associated with a vehicle passenger's side.

10. Apparatus for use in a vehicle having a side impact restraint for protecting a driver against side impacts and a side impact restraint for protecting a passenger against side impacts, comprising:

a first accelerometer; mounted on a driver's side of the vehicle and positioned with an axis of sensitivity of said first accelerometer substantially transverse to a vehicle direction of travel so as to be sensitive to sideways acceleration of the vehicle and providing an output signal indicative thereof;

a second accelerometer, mounted on a passenger's side of the vehicle and positioned with an axis of sensitivity of said second accelerometer substantially transverse to the vehicle direction of travel and 180° offset from said axis of sensitivity of said first accelerometer so as to be sensitive to sideways acceleration of the vehicle and providing an output signal indicative thereof; and control means for actuating the side impact restraint for the driver only when said output signal from said first accelerometer exceeds a primary threshold and said output signal from said second accelerometer is less than a safing threshold thereby indicating that an impact is occurring on the driver's side of the vehicle, and for actuating the side impact restraint for the passenger only when said output signal from said second accelerometer exceeds said primary threshold and said output signal from said first accelerometer is less than said safing threshold thereby indicating that an impact is occurring on the passenger's side of the vehicle.

11. The apparatus of claim 10 wherein said side impact restraint for said driver is an air bag operatively mounted in a side assembly of the vehicle associated with the driver's side and wherein said side impact restraint for said passenger is an air bag operatively mounted in a side assembly of the vehicle associated with the passenger's side.

12. A method for controlling actuation of a first actuatable restraint and a second actuatable restraint in a vehicle, said method comprising the steps of:

sensing a crash acceleration using a first acceleration sensor, said first acceleration sensor providing a primary crash signal when a crash event is sensed in a first direction and providing a safing crash signal when a crash event is sensed in a second direction;

sensing a second crash acceleration using a second acceleration sensor, said second acceleration sensor providing a safing crash signal when a crash event is sensed in said first direction and providing a primary crash signal when a crash event is sensed in said second direction;

actuating said first actuatable restraint when said first and second acceleration sensors indicate a crash event in said first direction; and actuating said second actuatable restraint when said first and second acceleration sensor indicate a crash event in said second direction.

13. The method of claim 12 further including the steps of orienting the axis of sensitivity of a first acceleration sensor substantially transverse to a direction of travel of the vehicle and orienting the axis of sensitivity of the second acceleration sensor substantially transverse to the vehicle direction of travel and 180° offset from said axis of sensitivity associated with said first acceleration sensor.

14. The method of claim 12 wherein said step of actuating said first actuatable restraint occurs when said primary crash signal from said first crash sensor exceeds a primary threshold and said safing crash signal from said second crash sensor is less than a safing threshold, and wherein said step of actuating said second actuatable restraint occurs when said primary crash signal from said second crash sensor exceeds said primary threshold and said safing crash signal from said first sensor is less than said safing threshold.

15. A method for protecting a vehicle driver against side impacts and for protecting a vehicle passenger against side impacts, said method comprising of the steps of:

mounting a first accelerometer on a driver's side of the vehicle and positioning an axis of sensitivity of said first accelerometer substantially transverse to a vehicle direction of travel so as to be sensitive to sideways acceleration of the vehicle and providing an output signal indicative thereof;

mounting a second accelerometer on a passenger's side of the vehicle and positioning an axis of sensitivity of said second accelerometer substantially transverse to the vehicle direction of travel and 180° offset from said axis of sensitivity of said first accelerometer so as to be sensitive to sideways acceleration of the vehicle and providing an output signal indicative thereof;

actuating the side impact restraint for the driver only when said output signal from said first accelerometer exceeds a primary threshold and said output signal from said second accelerometer is less than a safing threshold thereby indicating that an impact is occurring on the driver's side of the vehicle; and actuating the side impact restraint for the passenger only when said output signal from said second accelerometer exceeds said primary threshold and said output signal from said first accelerometer is less than said safing threshold thereby indicating that an impact is occurring on the passenger's side of the vehicle.

* * * * *